(12) United States Patent
Cai et al.

(10) Patent No.: US 11,839,943 B2
(45) Date of Patent: Dec. 12, 2023

(54) WHEEL POSITIONING FACE SCANNING DEVICE

(71) Applicant: CITIC Dicastal Co., Ltd., Qinhuangdao (CN)

(72) Inventors: Weimin Cai, Qinhuangdao (CN); Minghua Liu, Qinhuangdao (CN); Haidong Du, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 632 days.

(21) Appl. No.: 17/092,815

(22) Filed: Nov. 9, 2020

(65) Prior Publication Data

US 2021/0154785 A1    May 27, 2021

(30) Foreign Application Priority Data

Nov. 25, 2019 (CN) .......................... 201911161771.8

(51) Int. Cl.
*B23Q 3/18*   (2006.01)
*B23Q 17/24*  (2006.01)
*B60B 30/08*  (2006.01)

(52) U.S. Cl.
CPC ............. *B23Q 3/186* (2013.01); *B23Q 17/24* (2013.01); *B60B 30/08* (2013.01); *B23Q 2703/10* (2013.01)

(58) Field of Classification Search
CPC ........ B60B 30/08; B23Q 3/186; B23Q 17/24; B23Q 17/2471; B23Q 17/20
See application file for complete search history.

(56) References Cited

FOREIGN PATENT DOCUMENTS

| CN | 106379757 A | * | 2/2017 | |
| CN | 108543835 A | * | 9/2018 | ............. B21C 51/00 |

* cited by examiner

*Primary Examiner* — Bayan Salone
(74) *Attorney, Agent, or Firm* — IPro, PLLC

(57) ABSTRACT

The present invention discloses a wheel positioning face scanning device comprising a rack to which a motor is fixed, an output end of the motor is fixedly connected vertically upward to a positioning disc, a center of the positioning disc is fixedly connected vertically upward to a positioning shaft, and a radial positioning ring is fixed at the top end of the positioning shaft, which is capable of improving wheel yield and processing quality.

5 Claims, 4 Drawing Sheets

WHEEL POSITIONING FACE SCANNING DEVICE

TECHNICAL FIELD

The invention relates to the technical field of wheel machining, in particular a wheel positioning face scanning device.

BACKGROUND

A machine-filled blank of an aluminum wheel is obtained by a process such as smelting, casting, heat treatment, and the like, There are distortions in each part of the actual press-loaded blank, large partial wheel radial positioning surfaces, poor roundness, eccentricity in the press-loaded card process, resulting in issues such as misalignment, poor machining, and high balance rejection during the press-loaded process, affecting aluminum wheel yield and quality of machining.

SUMMARY

In view of this, the present invention aims to provide a wheel positioning face scanning device to scan the radial positioning face of the blank with a laser sensor prior to machining, to find the optimal loading point with the least amount of eccentricity, to perform the positioning and loading process in accordance with the optimal loading point, to improve the presence of misalignment, less processing, and more waste balance during the machining process, and to improve the wheel yield and the quality of the processing.

In order to achieve the purpose, the technical scheme of the invention is realized as follows:

A wheel positioning face scanning device includes a rack on which a motor is fixed, an output end of the motor is fixedly connected vertically upward to a positioning disc, a positioning disc is fixedly connected vertically upward to the wheel blank, a positioning shaft is fixedly connected vertically upward to the center of the positioning disc, a radial positioning ring is fixed to the head of the positioning disc, a first compressing claw is fixed to the head of the positioning disc, and a first laser sensor and a second laser sensor are respectively provided on the rack on the side of the positioning disc to the wheel blank.

In some embodiments, the rack is fixed with a hollow T-shaped mounting seat, the motor is mounted at the bottom of the mounting seat, and the output of the motor is connected vertically upwards through the mounting seat to the positioning disc, and the positioning disc is connected with the mounting seat by way of a ball bearing.

In some embodiments, the output of the motor is fixedly connected to the lower end of the connecting shaft, and the upper end of the connecting shaft is fixedly connected to the positioning disc.

In some embodiments, deep groove ball bearing is provided between the connecting shaft and mounting seat.

In some embodiments, deep groove ball bearing comprises two groups spaced up and down fixed between the connecting shaft and mounting seat.

Compared with the prior art, the wheel positioning face scanning device provided by the invention has the following advantages:

The present invention utilizes a laser sensor to scan the radial positioning surface of the blank prior to machining to find the optimum loading point with the least amount of eccentricity, to perform the positioning and loading process in accordance with the optimum loading point, to improve the problems of misalignment, less processing, and more waste balance during the machining process, and to improve wheel yield and quality of processing.

BRIEF DESCRIPTION OF FIGURES

The accompanying drawings, which are included to provide a further understanding of the invention, illustrate embodiments of the invention and together with the description serve to explain the invention and do not constitute a limitation of the invention. In the drawings.

Figure 1:
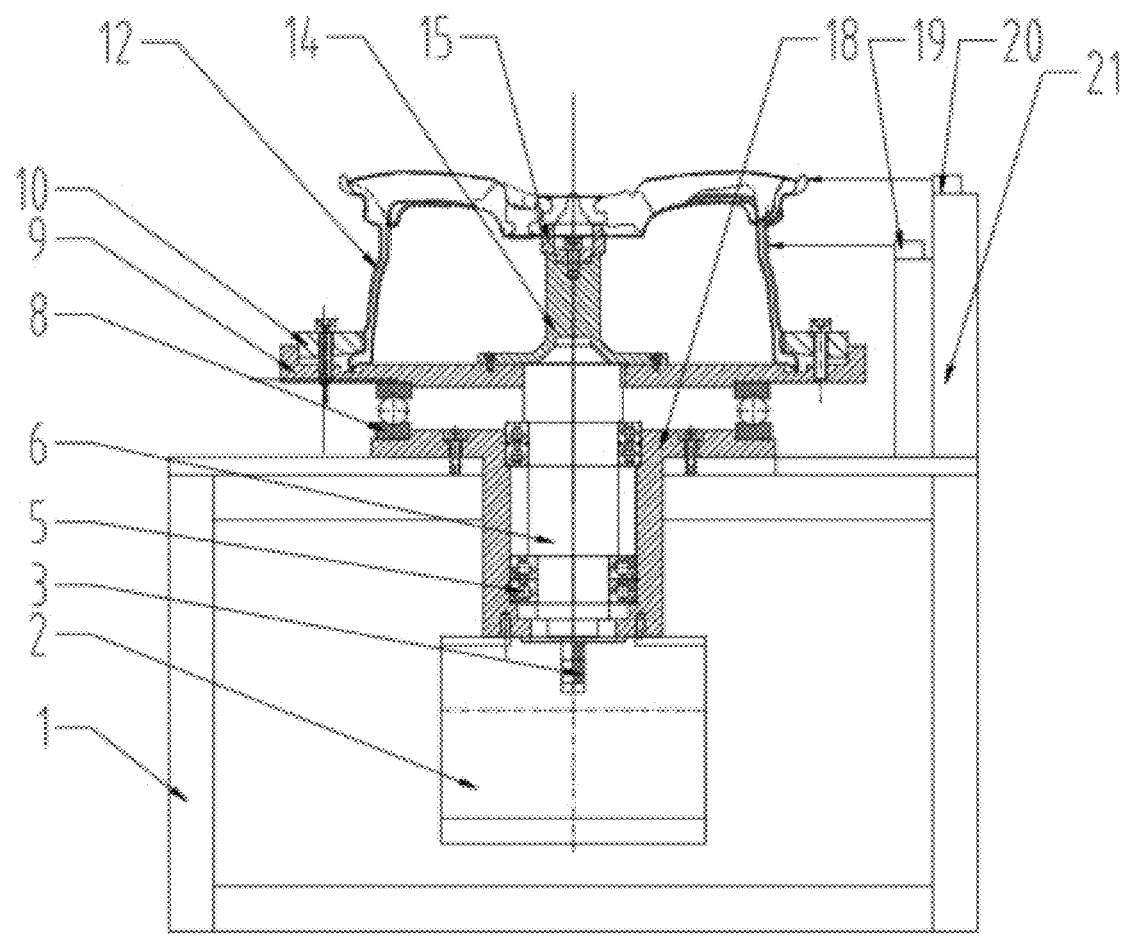
FIG. 1 is front view of a wheel positioning face scanning device according to the present invention.

Description of Reference Numerals:

1—rack, 2—motor, 3—key, 5—deep groove ball bearing, 6—connecting shaft, 8—thrust ball bearing, 9—positioning disc, 10—first compressing claw, 12—wheel blank, 14—positioning shaft, 15—radial positioning ring, 18—mounting seat, 19—first laser sensor, 20—second laser sensor, 21—sensor mounting seat, 22—compression plate, 23—axial positioning block, 24—second compressing claw, and 25—radial positioning block.

DETAILED DESCRIPTION

It should be noted that embodiments of the present disclosure and features of the embodiments may be combined with one another without conflict.

The technical solution of the present disclosure will be described clearly and completely hereinafter with reference to the accompanying drawings and in combination with embodiments, and obviously, the embodiments described are only a part of embodiments of the present disclosure, and are not all of embodiments thereof. Based on the embodiments of the present disclosure, all other embodiments obtained by a person of ordinary skill in the art without involving any inventive effort fall within the protection scope of the present disclosure.

Figure 2:
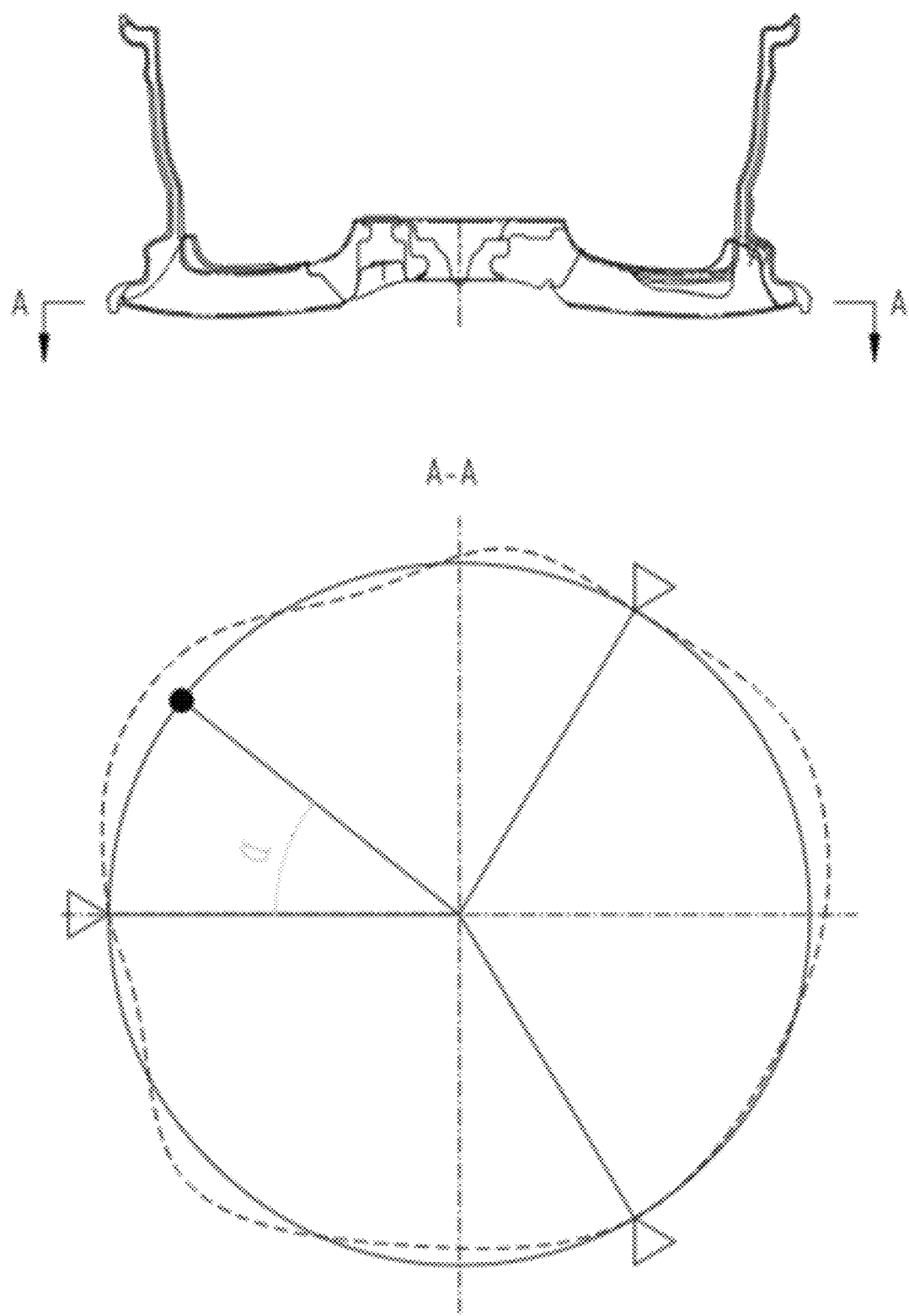
FIG. 2 is a schematic diagram of fixed-point clamping of the wheel positioning face scanning device.
Figure 3:
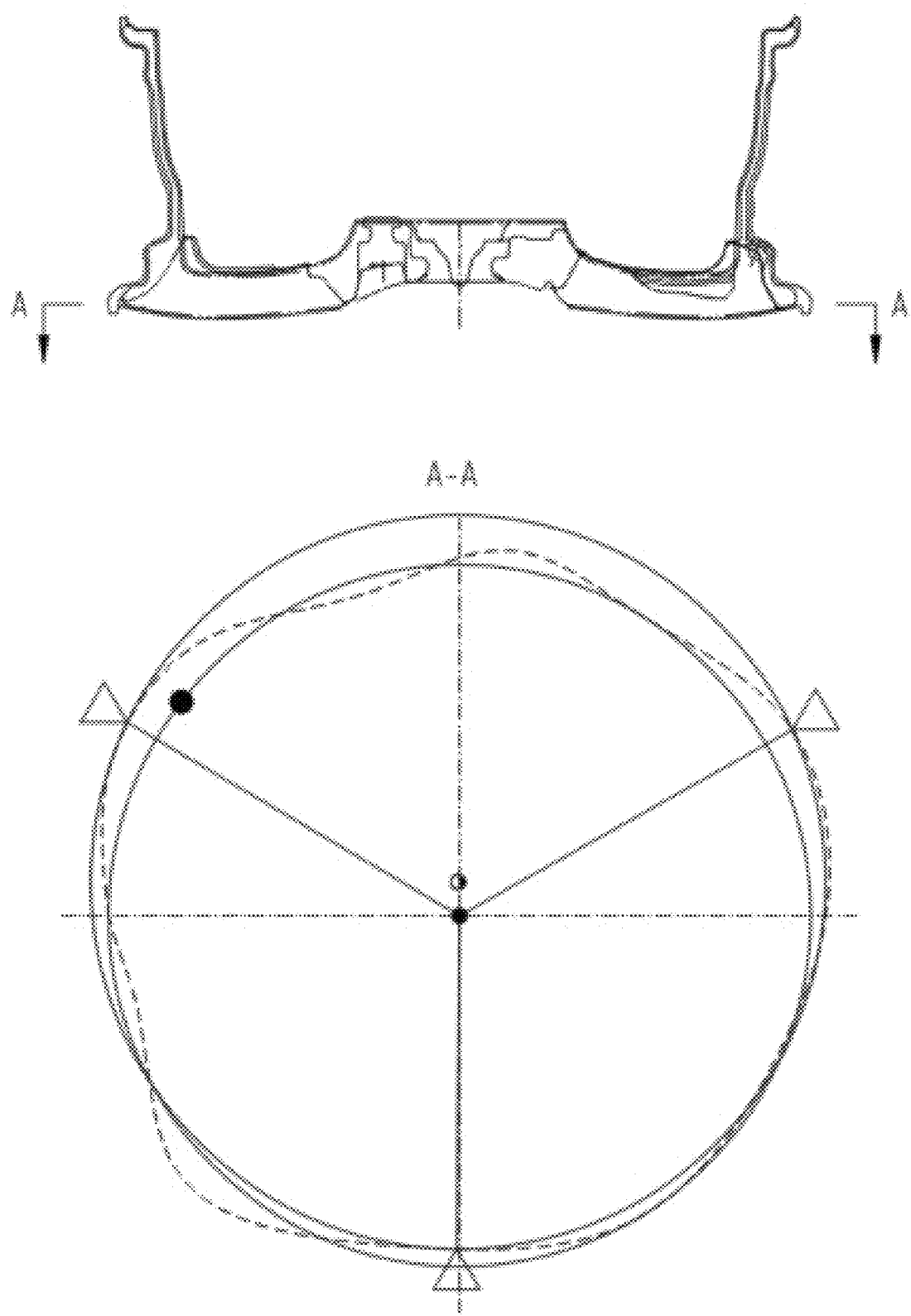
FIG. 3 is a schematic diagram of common clamping of the wheel positioning face scanning device.
Figure 4:
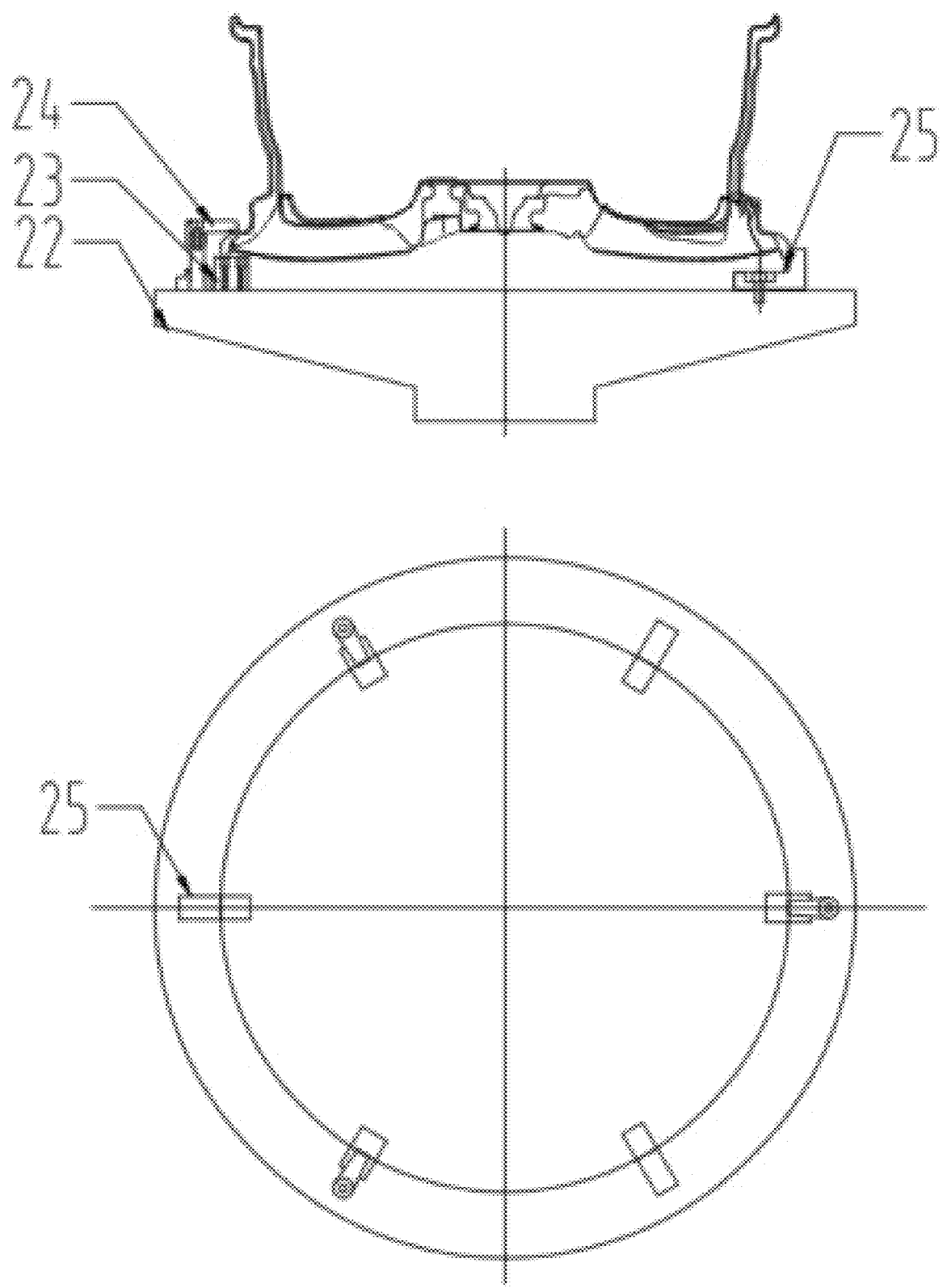
FIG. 4 is a schematic diagram of wheel clamping of the wheel positioning face scanning device.

The wheel positioning face scanning device of an embodiment of the present invention is described below in conjunction with an embodiment with reference to FIGS. 1-4.

A wheel positioning face scanning device includes structures such as rack 1, motor 2, key 3, deep groove ball bearing 5, connecting shaft 6, thrust ball bearing 8, positioning disc 9, first compressing claw 10, wheel blank 12, positioning shaft 14, radial positioning ring 15, mounting seat 18, first laser sensor 19, second laser sensor 20, sensor mounting seat 21, compression plate 22, axial positioning block 23, second compressing claw 24, and radial positioning block 25.

In some embodiments, mounting seat 18 is connected to rack 1 by screws, motor 2 is connected to mounting seat 18 by screws, connecting shaft 6 is connected to motor 2 by key 3, mating with mounting seat 18 by deep groove ball bearings 5 and deep groove ball bearings 5, positioning disc 9 is connected with connecting shaft 6, mating with mounting seat 18 by thrust ball bearings 8, positioning disc 14 by screws to positioning disc 9, radial positioning ring 15 by screws to positioning shaft 14, wheel blank 12 by radial positioning ring 15.

In some embodiments, the wheel positioning face fixed-point clamping method, comprising the following steps:

S1, placing a wheel blank 12 on a positioning disc 9 and a radial positioning ring 15 and compressing the wheel blank 12 through first compressing claws 10;

S2, driving the wheel blank 12 by a motor 2 to rotate, scanning an outer contour of the wheel blank 12 by a first laser sensor 19 and identifying an air valve hole, and scanning an outer rim of the wheel blank 12 by a second laser sensor 20 to obtain its actual contour line;

S3, comparing the actual contour line with a theoretical contour line, and selecting three clamping points having the minimum eccentricity between the actual contour line and the theoretical contour line and spaced by 120 degrees; and S4, calculating angles α between the clamping points and the air valve hole, and clamping the wheel blank according to the angles α.

Compared with the prior art, the wheel positioning face scanning device of the present invention has the following advantages:

The present invention utilizes a laser sensor to scan the radial positioning surface of the blank prior to machining to find the optimum loading point with the least amount of eccentricity, to perform the positioning and loading process in accordance with the optimum loading point, to improve the problems of misalignment, less processing, and more waste balance during the machining process, and to improve wheel yield and quality of processing.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A wheel positioning face scanning device, comprising a rack, wherein a motor is fixed to the rack, an output end of the motor is fixedly connected with a positioning disc in a vertically-upward mode, the positioning disc is configured to axially position a wheel blank, a center of the positioning disc is fixedly connected with a positioning shaft in a vertically-upward mode, a radial positioning ring is fixed to a top end of the positioning shaft, the radial positioning ring is configured to radially position the wheel blank, first compressing claws are arranged around the positioning disc, and a first laser sensor and a second laser sensor are respectively arranged at positions, corresponding to an air valve hole and an outer rim of the wheel blank, of the rack on one side of the positioning disc.

2. The wheel positioning face scanning device according to claim 1, wherein a hollow T-shaped mounting seat is fixed to the rack, the motor is mounted at a bottom of the mounting seat, the output end of the motor vertically upwards penetrates through the mounting seat to be fixedly connected with the positioning disc, and the positioning disc is connected with the mounting seat through a thrust ball bearing 8.

3. The wheel positioning face scanning device according to claim 2, wherein the output end of the motor is fixedly connected to a lower end of a connecting shaft, and an upper end of the connecting shaft is fixedly connected with the positioning disc.

4. The wheel positioning face scanning device according to claim 3, wherein deep groove ball bearings are arranged between the connecting shaft and the mounting seat.

5. The wheel positioning face scanning device according to claim 4, wherein the two sets of deep groove ball bearings arranged in an up-down spaced mode are fixed between the connecting shaft and the mounting seat.

* * * * *